United States Patent Office 3,478,354
Patented Nov. 11, 1969

3,478,354
RADAR METHOD USING MIE REGION ANALYSIS
George Michael Foster, 1422 Mount Hope Ave., Rochester, N.Y. 14620, and Louis Vincent Surgent, Jr., 323 Adair Court, Joppa Towne, Md. 21085
Continuation-in-part of application Ser. No. 549,626, May 12, 1966. This application Dec. 6, 1967, Ser. No. 688,538
Int. Cl. G01s 9/02
U.S. Cl. 343—5  3 Claims

ABSTRACT OF THE DISCLOSURE

Method of discriminating among radar echo signals to recognize signals received from a predetermined target. The radar is operated at plural frequencies in the characteristic Mie frequency spectral range of the predetermined target, and variations in the detected echo signals are compared with the characteristic Mie frequency variations of the predetermined target.

Brief summary of the invention

This application is a continuation-in-part of our copending application, Ser. No. 549,626, filed May 12, 1966, and now abandoned.

This invention relates to novel radar methods and apparatus, and, more particularly, to novel methods and apparatus for identifying predetermined targets.

In the present state of the arms race, it is thought to be important to distinguish certain targets from others. The problem is of major concern in connection with the development of anti-missile-missile systems, because an enemy may be expected to deploy a large number of decoys with each active warhead, and it is uneconomic to waste the anti-missile-missiles by firing them at the decoys. Many of the decoys may be expected to have as large a radar cross section as the primary warheads and not to be distinguishable solely by the relative intensities of the echo signals received from them.

It is known that all electrically conductive objects exhibit a characteristic resonant response to electromagnetic radiation at certain frequencies depending upon the shapes and dimensions of the objects. At very low frequencies, most objects reflect substantially no radio energy, but act simply as diffracting elements. As the frequency is increased to the point where the object becomes a significant fraction of a half wavelength of the radiation, its radar cross section increases very sharply, and, as the frequency is further increased, the reflection increases to a maximum, and then declines, and fluctuates along a series of minima and maxima until the frequency is increased to a point where the wavelength is much shorter than any operatively reflecting portion of the object. At these relatively high frequencies, the object returns only an amount of energy corresponding to its optical cross section.

The variations of the radar cross section of any conductive object may be determined empirically, and may be referred to as the Mie region, or Mie range characteristic. The characteristic has been thoretically calculated for the cases of a sphere, a dipole, and a cone, and may be determined empirically for any other object.

Briefly, the invention contemplates the use of Mie region spectroanalysis for target identification in radar searching. In accordance with the invention, a radar is operated at selected frequencies in the characteristic Mie region of the target to be identified. The signals returned from the target are analyzed and compared with the known Mie region characteristic of the selected target, thus enabling discrimination between the selected target and decoys. The analysis may be carried out on either a simultaneous or a sequential basis. For simultaneous analysis, the radar is broad-banded so that each transmitted pulse includes a significant amount of energy at each of the Mie region frequencies of interest, and the receiver is arranged to respond reasonably uniformly to all of the frequencies of interest. The return signals are then analyzed. They may, for example, be applied to an array of filters, and the outputs of the filters used to produce a spectrum profile. For sequential operation, the radar is tuned to the various different frequencies of interest successively, and the intensities of the return signals at the various different frequencies are compared with the predetermined Mie region characteristic of the selected target.

Detailed description

A representative embodiment of the invention will now be described in conjunction with the accompanying drawing, wherein.

Target recognition according to the preferred form of the invention is based on a comparison of the relative strengths of echo signals at at least three different frequencies in the spectral region of the two lowest frequency resonant responses of the predetermined target. The lowest frequency at which the selected target appears to resonate is the one at which its effective dimensions correspond approximately to one-half wavelength of the incident radiation. At this frequency the target usually returns the maximum echo signal, and its radar cross section is, in most cases, at least several times its optical cross section. When the echo signal is plotted as a function of frequency, the signal strength appears as a damped oscillatory curve, with the first (lowest frequency) peak usually much larger than the subsequent peaks, which appear at higher frequencies.

In the presently preferred form of the invention, the target echo signal is analyzed to determine its relative strength at the peak of the curve, and at at least two other frequencies, which are selected in view of the predetermined Mie region characteristic of the target selected for recognition. In some cases, for example, identification may be adequately established simply by comparing the echo signal at the peak with the echo signals at two frequencies on opposite respective sides of the peak. In other cases, it may be desirable to compare the signal at the first peak with the signal at the second peak and with the signal at a frequency between the first and second peaks. For maximum certainty of identification, it is desirable to develop a continuous spectrum including at least the first two peaks of the Mie region characteristic of the selected target, and extending well beyond the crest of the second peak.

Figure 1:
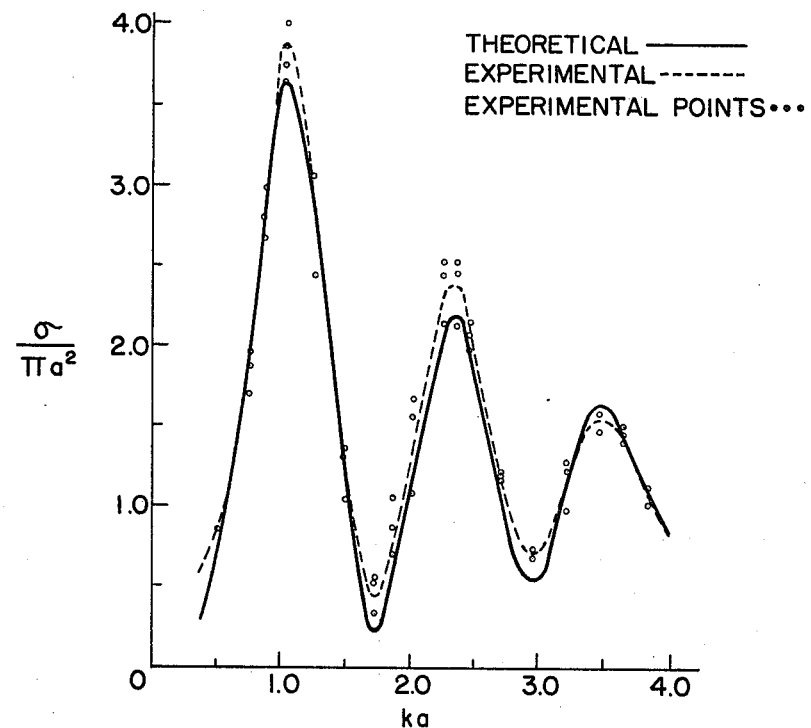
FIGURE 1 is a chart illustrating the Mie region characteristic of conductive spheres.

FIGURE 1 is a chart from an article entitled "Electromagnetic Scattering From Metal and Water Spheres," by A. L. Aden, published in the Journal of Applied Physics, vol. 22, p. 601 (1951). It illustrates the close correlation between the theoretical and empirical radar cross sections of conductive spheres, and the characteristic variations in cross section as a function of the frequency of the radiation.

Figure 2:
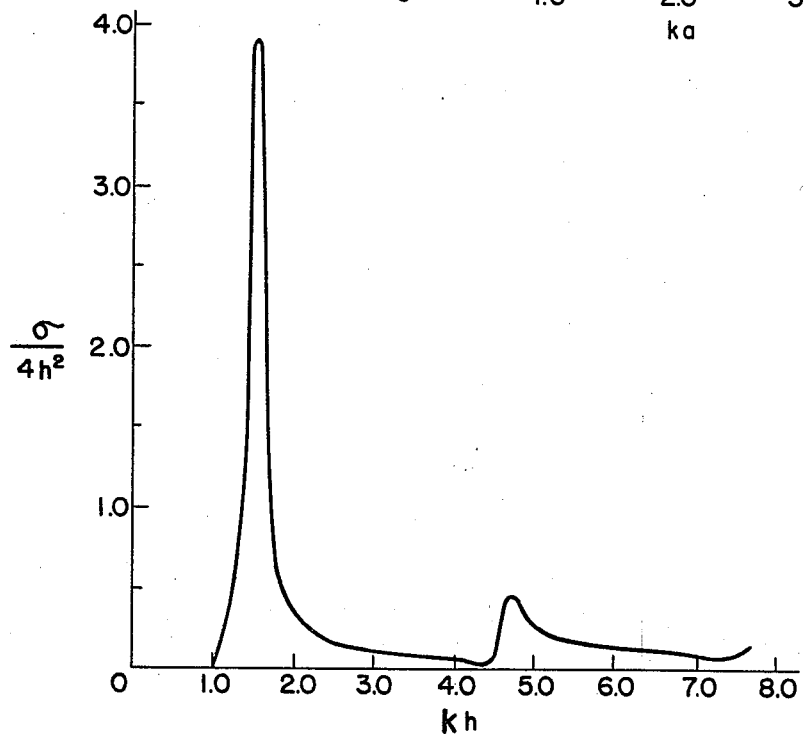
FIGURE 2 is a chart illustrating the Mie region characteristic of thin conductive rods at broadside incidence.

FIGURE 2 is a chart from an article entitled "Reflection of Electromagnetic Waves From Other Metal Strips," by K. Lindroth, published in the Transactions of the Royal Institute of Technology, Stockholm, No. 910 (1955). It illustrates the Mie region characteristic of thin conductive rods.

Figure 3:
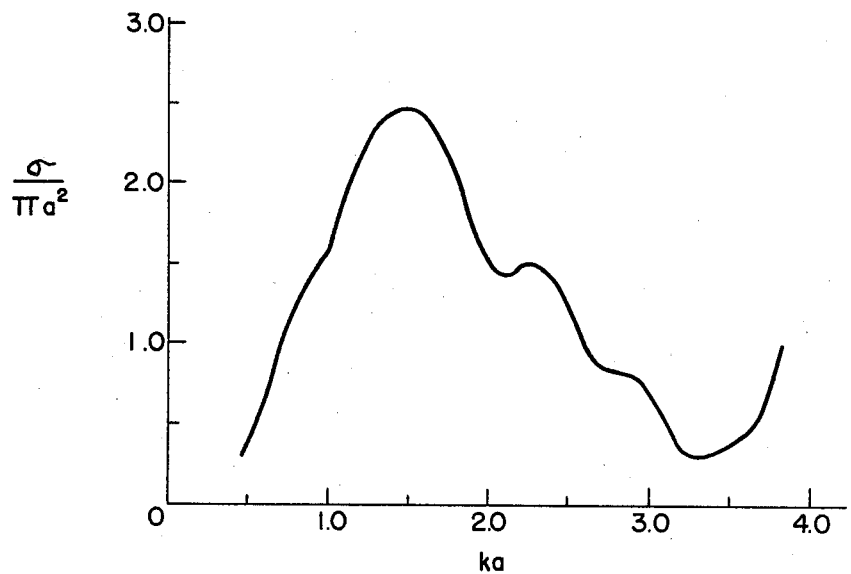
FIGURE 3 is a chart illustrating the Mie region characteristic of conductive cones oriented with their noses pointing directly at the source of radiation.

FIGURE 3 is a chart by Schultz, Ruckgabem, Schindler, and Rogers, entitled "The Theoretical and Numerical Determination of the Radar Cross Section of a Finite Cone," published at page 1065 of the Proceedings of the I.E.E.E., August 1965. It illustrates the radar cross section of a cone of base radius $a$, and having an apex angle of 30°, as viewed nose-on.

In all three figures, the symbol $\sigma$ represents the radar, or back scattering cross section of the object, and the ordinate values are plotted, for convenience, in terms of the radar cross section divided by a factor to make the ordinate quantity dimensionless. In the case of the sphere, the factor is $\pi a^2$, where $a$ is the radius of the sphere. For the thin rods, the factor is $4h^2$, where $h$ is one-half the length of the rod. For the cones, the factor is $\pi a^2$, where $a$ is the radius of the circular base of the cone.

The abscissas are also scaled for the generalized cases. In FIGURE 1, the abscissa scale is in terms of $ka$, where $k$ is $2\pi/\lambda$, $\lambda$ is the wavelength of the incident radiation, and $a$ is the radius of the sphere. In FIGURE 2, the abscissa scale is $kh$, and in FIGURE 3, the abscissa scale is $ka$, where $a$ is the radius of the base of the cone.

By simple substitution, the scales may be converted to indicate actual physical dimensions and wavelengths.

From these three examples, it may be readily seen that the Mie region characteristics of objects are highly individualized, and are recognizably different for objects of different shapes.

By use of modern techniques of signal analysis, echo signals from any actual target may be manipulated to develop a Mie region spectral curve covering any desired frequency range. Such curve may then be compared, either visually or electrically, with plural, previously prepared curves of known characteristics of selected objects for optimum identification.

Although it is presently thought that the practice of the invention will find its most advantageous utilization in distinguishing missiles at high altitudes from decoy targets, it is expected also to be of advantage for distinguishing selected targets from clutter signals such as, for example, distinguishing floating objects from sea clutter, and for distinguishing conductive targets from forest clutter as described in our co-pending application filed concurrently herewith, Ser. No. 688,537, and entitled Forest Terrain Search Radar Method and Apparatus.

What is claimed is:

1. Method of identifying a radar target comprising detecting the target with a radar operating at plural selected frequencies in the Mie region of a known target, and comparing received echo signals with the Mie region characteristic response of the known target.

2. Method according to claim 1 wherein each transmitted pulse of the radar includes substantial signal components at all of the plural selected frequencies.

3. Method according to claim 1 wherein the energy of each transmitted pulse of the radar is concentrated within a narrow band of frequencies, and the energies of successive pulses are concentrated in different respective bands so that the radar sweeps through a spectrum including all of the selected frequencies over a sequence of plural transmitted pulses.

References Cited

UNITED STATES PATENTS

| 3,157,874 | 11/1964 | Altar et al. | 343—5 |
| 3,355,579 | 11/1967 | Robertson | 343—5 XR |

OTHER REFERENCES

Merrill I. Skolnik, Introduction to Radar Systems, McGraw-Hill (1962), pp. 40 to 56.

Berkowitz, editor, Modern Radar, John Wiley & Sons (1965), "Radar Cross-Section Target Models," by Weinstock, pp. 546 to 574.

RODNEY D. BENNETT, JR., Primary Examiner

T. H. TUBBESING, Assistant Examiner

U.S. Cl. X.R.

343—100